Figure 1:
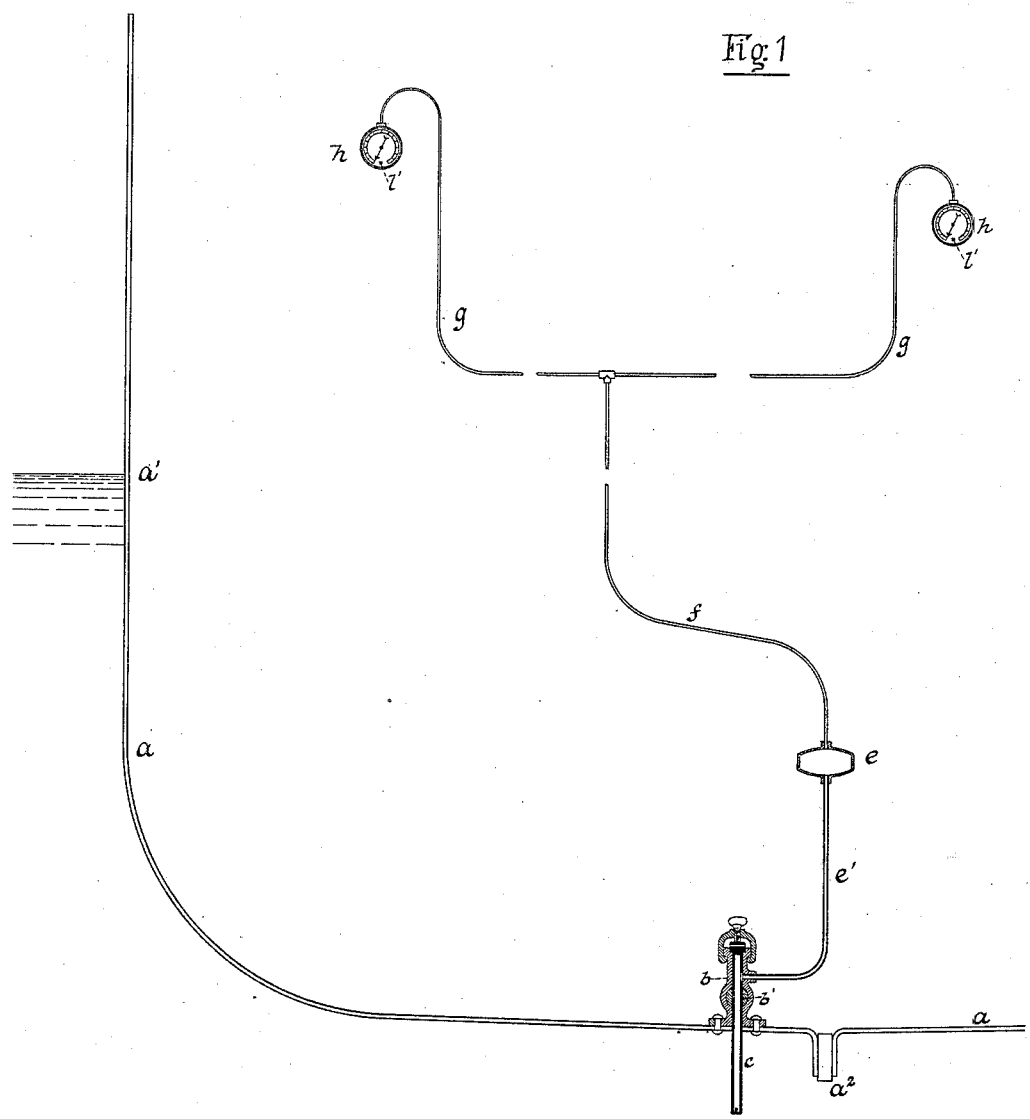

(No Model.) 2 Sheets—Sheet 1.

O. HULT.
HYDRO AEROSTATIC SHIP LOG.

No. 319,582. Patented June 9, 1885.

Witnesses
H. D. Williams
Charles A. Maxfield

Olof Hult.
Inventor
per
Alfred Shedlock
Atty.

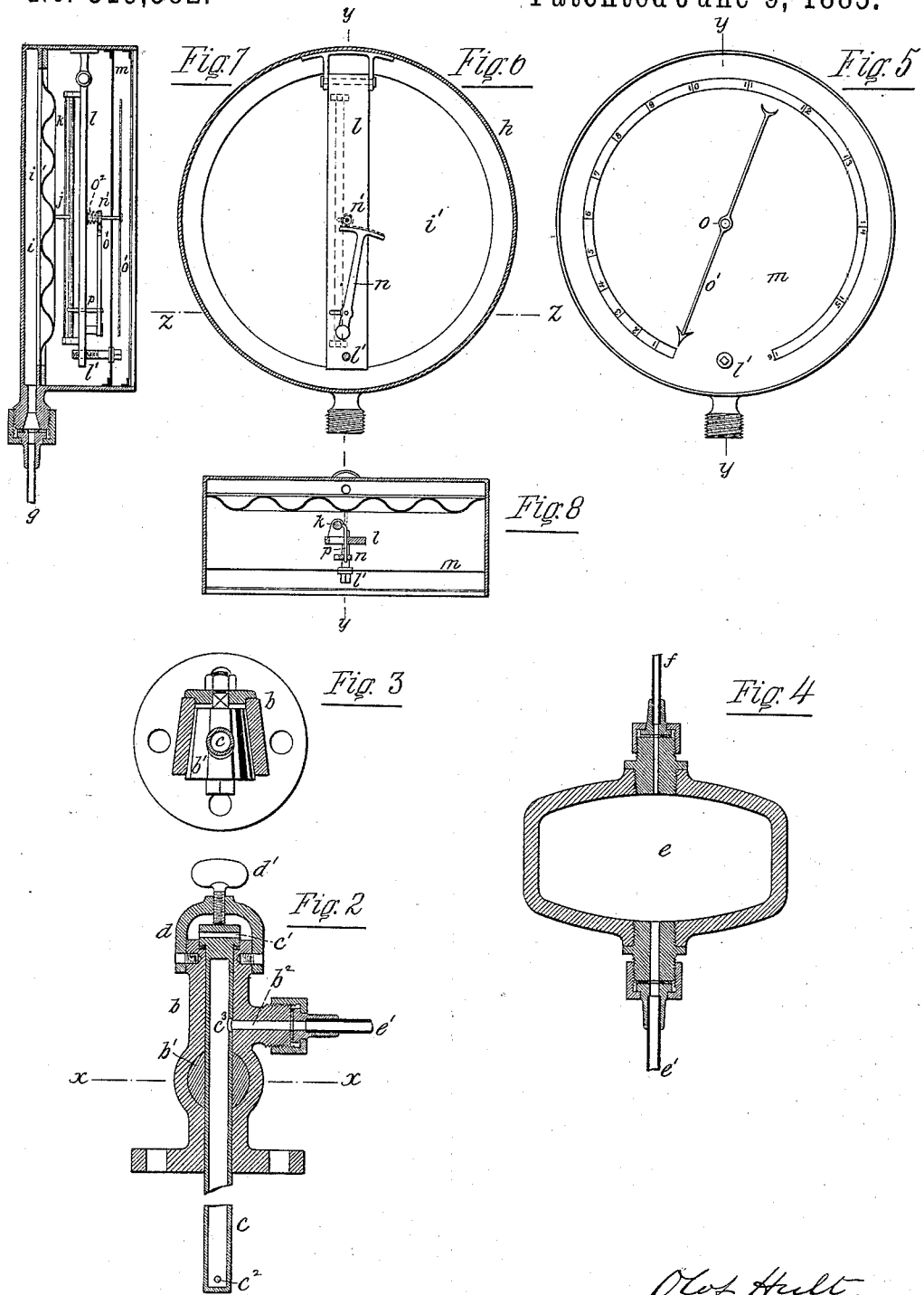

UNITED STATES PATENT OFFICE.

OLOF HULT, OF KARLSKRONA, SWEDEN.

HYDRO-AEROSTATIC SHIP-LOG.

SPECIFICATION forming part of Letters Patent No. 319,582, dated June 9, 1885.

Application filed October 8, 1884. (No model.) Patented in Sweden June 5, 1884, No. 152.

*To all whom it may concern:*

Be it known that I, OLOF HULT, a subject of the King of Sweden, residing at Karlskrona, Sweden, have invented certain new and useful Improvements in Hydro-Aerostatic Ships' Logs, (for which I obtained a patent in Sweden, No. 152, bearing date of the 5th June, 1884,) of which the following is a specification.

This invention relates to apparatus for measuring or indicating the speed of ships; and it consists of an arrangement and combination of devices whereby the hydro-aerostatic principle is applied to ships' logs in such a manner as to give continuous and perfect indications of the speed of ships. To this end a perforated tube closed at its lower end is so placed as to project below the bottom of the ship, with the perforation in the direction of travel and sufficiently below the bottom to receive the full effect of the water-pressure due to the speed of the ship, and it is preferably placed near the keel, at or near the center of the ship, to avoid as much as possible variations of pressure due to rolling or pitching, which avoidance is assisted by the lower end of the tube being closed. This tube is combined with means by which it may be withdrawn into the interior of the ship and the opening through which it passes closed, and when in position it is connected by means of a pipe with an air-vessel located in a suitable position somewhat below the water-line, so that it is partly filled with the water that enters the perforated tube, and this air-vessel is connected by means of a small pipe or pipes to one or more pressure-gages of suitable construction located in any desired part or parts of the ship, and with the dial or dials graduated empirically or otherwise to indicate the speed in knots per hour. The function of this air-vessel, with the small pipe-connections, is to assist in eliminating or neutralizing the effects on the gage or gages which would be produced by the rolling and pitching motions, said air-vessel having sufficient capacity to retain, by the elasticity of the air which is above the water therein, any variations of pressure of short duration such as would be due to the rolling or pitching of the ship, thus preventing sudden or pulsatory movements of the index or indexes of the gage or gages, and allowing correct readings to be had even during rough weather. It is essential with this class of ships' logs that the indicating-gages be adjustable, so that they may be set to give correct readings with different load-lines. Such a gage forms part of this invention, in combination with the other devices described, as will be fully hereinafter set forth, reference being had to the accompanying drawings, in which—

Figure 1, Sheet 1, represents a section of a ship with my improved hydro-aerostatic log applied thereto. Fig. 2, Sheet 2, is an enlarged central section of the pressure-receiving tube with its housing. Fig. 3, Sheet 2, is a transverse section of the same through the line $x\ x$. Fig. 4, Sheet 2, is an enlarged section of the air-chamber. Fig. 5, Sheet 2, is a front view of the pressure-gage. Fig. 6, Sheet 2, is a similar view with the front plate removed. Fig. 7, Sheet 2, is a vertical section through the line $y\ y$; and Fig. 8, Sheet 2, is a transverse section through the line $z\ z$.

In Fig. 1, $a$ represents a part midship-section of a ship, and $a'$ the water-line. Secured to the bottom, near the keel $a^2$, is the housing $b$, through a vertical hole in which and through the plug-cock $b'$ is passed the pressure-receiving tube $c$. This tube $c$ has an enlarged closed head, $c'$, under which is placed a packing in a recess formed in the top of the housing $b$, and it is held in place by means of the swing-yoke $d$ and screw $d'$. The bottom of the tube $c$ is closed, as shown, and a hole, $c^2$, is provided in its side and made to face the direction the ship is moving, so that the water, by the pressure due to such forward motion of the ship, enters the tube and partly fills the air-vessel $e$, and imparts a corresponding pressure to the air in the air-vessel $e$ and indicating-gages. The pipe $e'$ connects the air-vessel $e$ to the side of the housing $b$, and has communication to the interior of the tube $c$ through the hole $c^3$ in the tube and passage $b^2$ in the housing $b$.

When it is required to remove the tube $c$ for cleaning it or for other reasons, the screw $d'$ is loosened, the yoke $d$ swung over, and the tube drawn up until its lower end passes beyond the plug-cock $b'$, when this plug-cock is closed and the tube $c$ entirely withdrawn without allowing any water to enter through the housing $b$.

From the upper part of the air-chamber $e$ extends the small pipe $f$, to which are connected pipes $g$ $g$, communicating with the pressure-gages $h$ $h$, located in any desired part of the ship. These gages may be of any suitable construction; but a form of gage well adapted to be used for this purpose is shown at Figs. 5, 6, 7, and 8, in which $i$ is an inclosed chamber to which the pipe $g$ is connected, and which has a corrugated front plate, $i'$. Against the center of this corrugated plate $i'$ bears the end of the small crank-arm $j$ on the shaft $k$, fitted in bearings on the plate $l$, pivoted at its upper end to the case of the gage, and controlled and held at its lower end by the screw $l'$, which is held so as to be rotated only, in the face-plate $m$. On the front of the plate $l$ is pivoted the sector-wheel $n$, which meshes into the pinion $n'$ on the spindle $o$, carrying the index or pointer $o'$. Motion is imparted to this sector $n$ from the corrugated plate $i'$, so that the index moves forward by an increase of pressure in the chamber $i$, by means of the arm $p$, projecting from the shaft $k$ through an elongated hole in the plate $l$ into a hole in the arm of the sector $n$ near its center of motion. A hair-spring, $o^2$, on the spindle $o$ causes the index or pointer $o'$ to move back upon a retrograde movement of the corrugated plate $i'$, due to a diminution of pressure in the chamber $i$.

It is obvious that the divisions on the plate $m$ may be made to indicate any scale or measure of speed; but I prefer to arrange them to give readings of knots per hour; and it is also obvious that the corrugated plate $i'$ will be more or less dilated according to the load-line of the ship, so it is necessary, when the ship is loaded and ready to sail, to adjust the gage, and that, too, in still water, to cause proper indications to be had when the ship is moving. This is accomplished by operating the screw $l'$, thereby moving the lower end of the plate $l$ to or from the corrugated plate $i'$, thus rotating the shaft $k$, which actuates the sector $n$ and pinion $n'$, until the pointer $o'$ stands at the zero-mark of the scale.

Having now described the nature of my invention and the manner in which it is applied, what I claim, and desire to secure by Letters Patent, is—

1. A hydro-aerostatic ship's log composed of a pressure-receiving tube projecting below the bottom of the ship, an air-chamber connected thereto by means of a pipe and located below the water-line, and an indicating gage or gages connected to the air-vessel by means of a small pipe or pipes, in combination, substantially as and for the purpose set forth.

2. The combination, with the pressure-receiving tube and air-vessel of a hydro-aerostatic ship's log, of a pressure-gage provided with means, substantially as described, whereby it is adjusted and set to give correct readings for various load-lines of the ship, as set forth.

3. The combination, with the tube $c$, having closed ends and provided with the holes $c^2$ $c^3$ in its sides, of the housing $b$, provided with the stop-cock $b'$, outlet-passage $b^2$, and retaining-yoke $d$ $d'$, substantially as and for the purpose set forth.

4. In combination, the pressure-receiving tube $c$, with closed lower end and holes $c^2$ $c^3$ in its sides, the air-chamber $e$, pipe $e'$, by which it is connected to the housing of the tube $c$, and the small pipes $f$ $g$ and pressure-gage $h$, substantially as and for the purpose set forth.

5. The pressure-gage $h$, provided with the adjusting-screw $l'$, by which its indicating mechanism is moved to or from the active surface of its air-chamber, in combination with the air-vessel $e$ and pressure-receiving tube of a hydro-aerostatic ship's log, substantially as and for the purpose set forth.

Signed at Karlskrona, Sweden, this 15th day of September, A. D. 1884.

OLOF HULT.

Witnesses:
K. W. RESÉN,
ERNST RAAF.